United States Patent
Sherriff (10) Patent No.: US 6,702,401 B2
(45) Date of Patent: Mar. 9, 2004

(54) ELECTRO-HYDRAULIC BRAKING SYSTEMS

(75) Inventor: Philip William Sherriff, Studley (GB)

(73) Assignee: Lucas Industries plc (GB)

( * ) Notice: Subject to any disclaimer, the term of this patent is extended or adjusted under 35 U.S.C. 154(b) by 132 days.

(21) Appl. No.: 09/946,236

(22) Filed: Sep. 5, 2001

(65) Prior Publication Data

US 2002/0005661 A1 Jan. 17, 2002

Related U.S. Application Data

(63) Continuation of application No. PCT/GB00/00797, filed on Mar. 6, 2000.

(30) Foreign Application Priority Data

Mar. 5, 1999 (GB) .............................. 9904956

(51) Int. Cl.⁷ .............................. B60T 13/18; B60T 8/32
(52) U.S. Cl. ....................... 303/11; 303/191; 303/116.1
(58) Field of Search ............................. 303/10, 11, 191, 303/116.1

(56) References Cited

U.S. PATENT DOCUMENTS

| | | | |
|---|---|---|---|
| 5,000,520 A | | 3/1991 | Schmitt |
| 5,108,265 A | * | 4/1992 | Koike .................... 303/10 |
| 5,584,543 A | * | 12/1996 | Sawada ................... 303/191 |
| 5,791,745 A | * | 8/1998 | Sakakibara .............. 303/11 |
| 5,927,832 A | * | 7/1999 | Fulks et al. ............. 303/167 |
| 6,092,878 A | * | 7/2000 | Watanabe ................ 303/115.4 |
| 6,203,123 B1 | * | 3/2001 | Oyama ................... 303/191 |
| 6,249,736 B1 | * | 6/2001 | Schmidt et al. ......... 303/191 |
| 6,367,890 B1 | * | 4/2002 | Hachtel ................. 303/115.4 |
| 6,389,349 B1 | * | 5/2002 | Hachtel ................. 303/11 |
| 6,446,490 B1 | * | 9/2002 | Lohner et al. .......... 303/11 |

FOREIGN PATENT DOCUMENTS

| | | |
|---|---|---|
| DE | 3227265 A1 | 1/1984 |
| DE | 3833473 A1 | 4/1990 |
| DE | 4014314 A1 | 12/1991 |
| WO | WO 98/57835 | 12/1998 |

OTHER PUBLICATIONS

Abstract in English of DE3227265, "Monitoring device for the energy supply to a plant actuated by pressure medium", obtained from the esp@cenet database, http://12.espacenet.com/dips/abstract?cy=ep&LG=en&PNP=DE3227265, printed Aug. 15, 2001.

* cited by examiner

Primary Examiner—Robert A. Siconolfi
(74) Attorney, Agent, or Firm—MacMillan, Sobanski & Todd, LLC (57) ABSTRACT

A vehicle electro-hydraulic braking system having a fluid pressure accumulator of the pre-charged diaphragm type which is used to store fluid under pressure, charged by means of a fluid pump or compressor driven either by an electric motor or directly from the vehicle engine for supply to a valve system which is adapted to supply the brake or brakes of the vehicle with fluid pressure in accordance with the level of the driver's braking demand, the control of the accumulator pressure being arranged to lie within a fixed control range, with a cut-in pressure defining the lower limiting pressure of the control range and a cut-out pressure defining the upper limiting pressure of the control range, and there being a warning pressure range defined between a warning pressure level and the cut-in pressure, wherein at least one of the warning, cut-in and cut-out pressure levels is arranged to be controlled in dependence upon temperature.

21 Claims, 7 Drawing Sheets

ELECTRO-HYDRAULIC BRAKING SYSTEMS

CROSS REFERENCE TO RELATED APPLICATIONS

This application is a continuation of PCT application NO. PCT/GB00/00797 filed Mar. 6, 2000 which claimed priority to application GB 9904956.1 filed Mar. 5, 1999, the disclosures of which are hereby incorporated by reference.

BACKGROUND

The present invention relates to electro-hydraulic braking EHB systems for motor vehicles".

Electro-hydraulic braking systems for motor vehicles are known which comprise a brake pedal, a braking device connected to at least one vehicle wheel, which is capable of being brought into communication with an electronically controlled valve arrangement in order to apply hydraulic fluid under pressure to the braking device, a hydraulic pump, and a hydraulic pressure reservoir fed by said pump for the provision of hydraulic fluid under pressure which can be passed to the braking device via the electronically controlled valve arrangement in order to apply hydraulic fluid under pressure, in proportion to the driver's braking demand as sensed at the brake pedal, to the braking device in so called 'brake by wire' mode.

The area of application of an electro-hydraulic braking system of this form encompasses among others anti-locking brake system control, anti-slip control, electronic brake force distribution, and vehicle stability control VSC.

In view of the act that, with an electrically-actuated braking system, the driver's wishes are acquired by sensors at the brake pedal, and conducted to the electronic control system by means of electrical signals, such systems are described as electronic braking systems (EBS) or "brake-by-wire" systems.

Furthermore, in modern vehicle systems, there are requirements to reduce costs, component weight, complexity and, more recently, to reduce system energy consumption. These savings have to be made without detriment to safety or system function. In the case of an electronically controlled braking system (EBS or Brake by Wire) having automatic hydraulic or pneumatic (fluid) braking, savings can be made in all areas by addressing the issue of pressurised fluid storage for brake actuation.

In a typical EBS system, a fluid pressure accumulator (pressurised reservoir) is used to store fluid under pressure, charged by use of a fluid pump or compressor driven either by an electric motor or directly from the engine via a belt and pulley arrangement, for supply to a valve system which is adapted to supply the brake or brakes of a vehicle with fluid pressure in accordance with the level of driver's braking demand. Typically, the pressure at which the fluid is stored within the accumulator is set at a relatively high level, which is set so as to be sufficient to actuate the brakes of the vehicle over the complete braking range of the vehicle. In order to achieve this relatively high pressure storage, a high pressure accumulator and pump system has to be employed with sufficient volume to supply several low pressure demands as well as sufficient pressure and volume to supply the infrequent high pressure brake applications.

It is common practice for the fluid pressure accumulator to be of the gas-charged diaphragm type wherein the housing of the accumulator is divided into two parts by means of a flexible diaphragm, one side of the diaphragm being coupled to the fluid pump and to pipework connected to the electronically controlled valve arrangement and the other side being closed and pre-charged with a volume of gas.

In accordance with conventional practice, the control of the accumulator pressure is arranged to lie within a fixed control range, with a lower limiting pressure of the control range being the so-called "cut-in"pressure and an upper limiting pressure of the control range being the so-called "cut-out" pressure. For this purpose, the accumulator pressure is sensed by means of a pressure sensor and evaluated by means of an electronic control unit which controls the accumulator by means of the aforementioned pump such that the pump is started when the accumulator pressure tends to fall short of the cut-in pressure level and is stopped when the accumulator pressure reaches the cut-out pressure level.

Below the cut-in pressure there is defined a so-called "warning pressure" level whereby there is a warning pressure range defined between the warning pressure level and the cut-in pressure. Thus, at times, in particular before starting the pump, the accumulator pressure can be in the warning range. However, if the accumulator pressure should fall short of the warning pressure level, then the electronic unit can draw conclusions in connection with the accumulator state as well as system faults and act accordingly, for example to energise a warning lamp.

Figure 1:
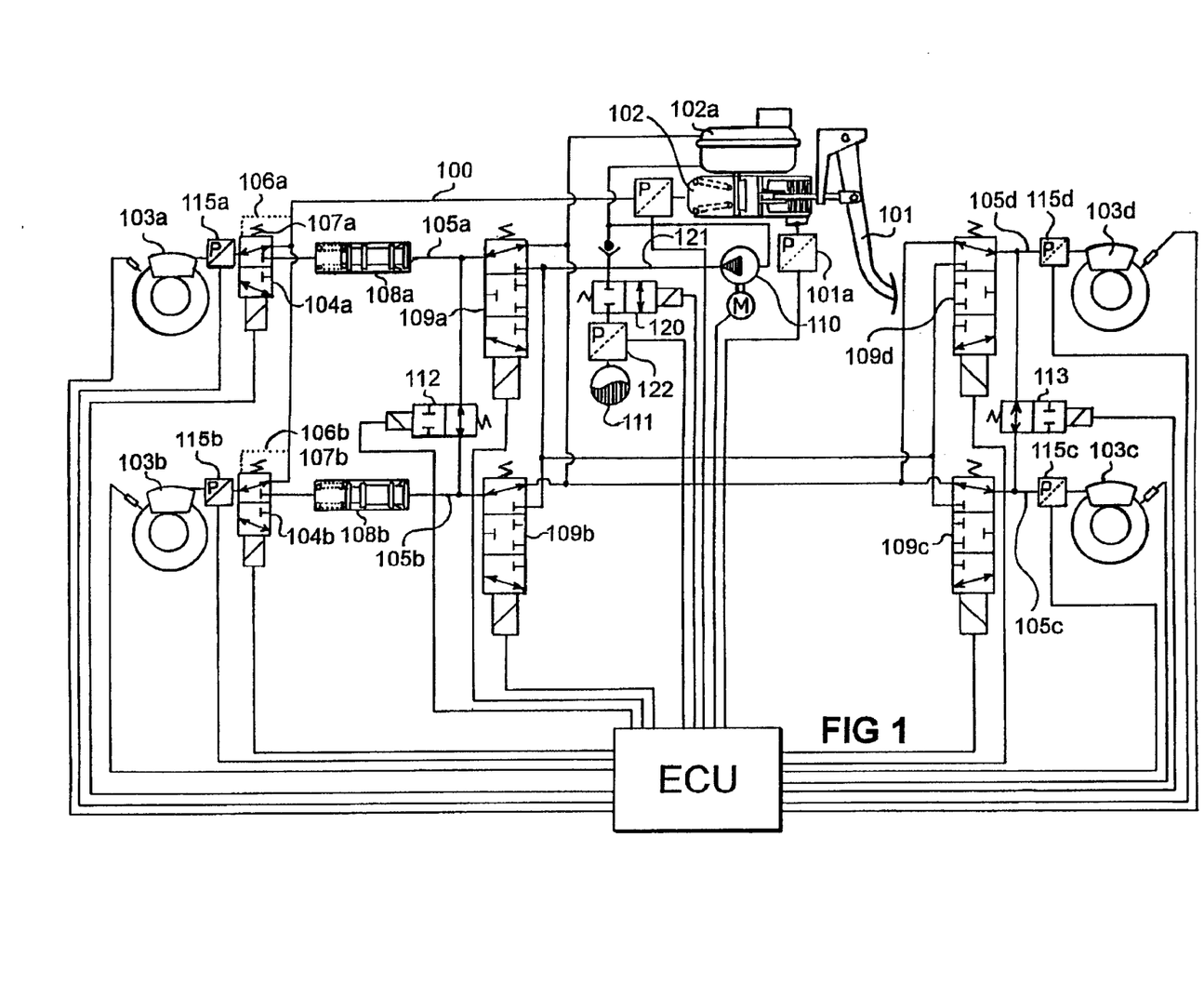
FIG. 1 is a schematic diagram of a vehicle braking system embodying a first aspect of the present invention.

It is known already that such an accumulator has the disadvantage that the pre-charge pressure of the gas depends on the temperature. This means that the lower is the temperature, the lower is the pre-charge pressure and vice versa. Consequently, the fluid volume available in the control and warning range also depends on the temperature, namely the higher is the temperature, the greater is the fluid volume available. Reference is directed to FIG. 1 of the accompanying drawings in this connection, which illustrate the latter coherence.

In safety critical applications, such as electro-hydraulic braking systems (EHB), variations of the available fluid volume are undesirable. In particular, in electro-hydraulic braking systems a minimum fluid volume should always be provided in the warning range so that a prescribed number of brake actuations is always capable of being executed, Besides, variations of the available fluid volume cause disturbing noises since they lead to a high operating frequency of the pump.

In accordance with the present invention, at least one of the warning, cut-in and cut-out pressure levels is arranged to be controlled in dependence upon temperature so that the available fluid volume in at least one of the control and warning ranges is maximised.

In one preferred embodiment, all three of the warning, cut-in and cut-out pressure levels are arranged to be varied with temperature.

In another preferred embodiment, the warning and cut-in pressure levels are arranged to be varied with temperature but the cut-out pressure remains constant with varying temperature.

In all cases, the variations must be coordinated so that the characteristic curves do not cross within the working ranges.

Advantageously, the pressure levels fall with temperature up to a predetermined temperature and then rise with temperature beyond that temperature.

BRIEF DESCRIPTION OF THE DRAWINGS

The invention is described further hereinafter, by way of example with reference to the accompanying drawings, in which.

DESCRIPTION OF THE PREFERRED EMBODIMENTS

The braking system of FIG. 1 includes a brake pedal 101 having an associated sensor 101a for the acquisition of the drivers braking demand. The driver's demand is transferred to an electronic control unit (ECU), evaluated there, and used as the source for the generation of electrical control signals for actuating valves, described in greater detail hereinafter, and a hydraulic pump 110. Switch-over valves 104a, 104b are arranged between a "push-through" brake circuit 100 and the wheel brakes of a vehicle axle 103a, 103b, in order to apply brake fluid to the wheel brakes 103a, 103b, either via the "push-through" brake circuit 100, or via electrically-actuated brake channels 105a, 105b (brake-by-wire). The push-through circuit is included for the purpose of enabling braking to be available if the brake-by-wire system fails and is fed from a brake cylinder 102 actuated by the brake pedal 101.

The switch over valves 104a, 104b, in the electrically non-actuated state, i.e. their preferred position, connect the "push-through" brake circuit 100 with the wheel brakes 103a, 103b, in which situation the connection to the electrically actuated brake channels 105a, 105b is blocked. In the event of electrical actuation, the switch-over valves 104a, 104b connect the wheel brakes 103a, 103b, with the electrically-actuated brake channels 105a, 105b, allocated to them, in which context, the connections to the "push-through" brake circuit 100 are blocked. In order to increase safety, for example in the event of a defective valve reset spring 107a, 107b, the switch-over valves 104a, 104b are each capable of being moved into the preferred position corresponding to the "push-through" actuation, by means of pressure control lines 106a, 106b.

In addition to this, elements referred to as de-coupling or separation cylinders 108a, 108b, are connected in the electrically-actuated brake channels 105a, 105b, upstream of the switch-over valves 104a, 104b. By means of the cylinders 108a, 108b, hydraulic separation between the "push-through" brake circuit 100 and the electrically-actuated brake channels 105a, 105b is ensured.

Brake pressure modulation in the electrically-actuated brake channels 105a, 105b, and in the electrically-actuated brake channels 105c, 105d, which are allocated to the wheel brakes of the other vehicle axle 103c, 103d, is effected in a known manner by means of control valves 109a, 109b, 109c, 109d, the brake pressure being provided by a pump 110 operated by an electric motor, and from a pressure reservoir 111 consisting of a gas-charged diaphragm accumulator. The pressure of the accumulator is measured by a sensor 122.

Shut-off valves 112 and 113 are arranged between the electrically actuated brake channels of a vehicle axle 105a, 105b and 105c, 105d respectively. These shut-off valves 112 and 113, in the non-actuated state, respectively connect the brake channels 105a, 105b and 105c, 105d to one another, while the brake channels 105a, 105b and 105c, 105d are mutually blocked in the actuated state.

The system as described thus far is conventional and operates in accordance with well-known techniques.

Figure 2:
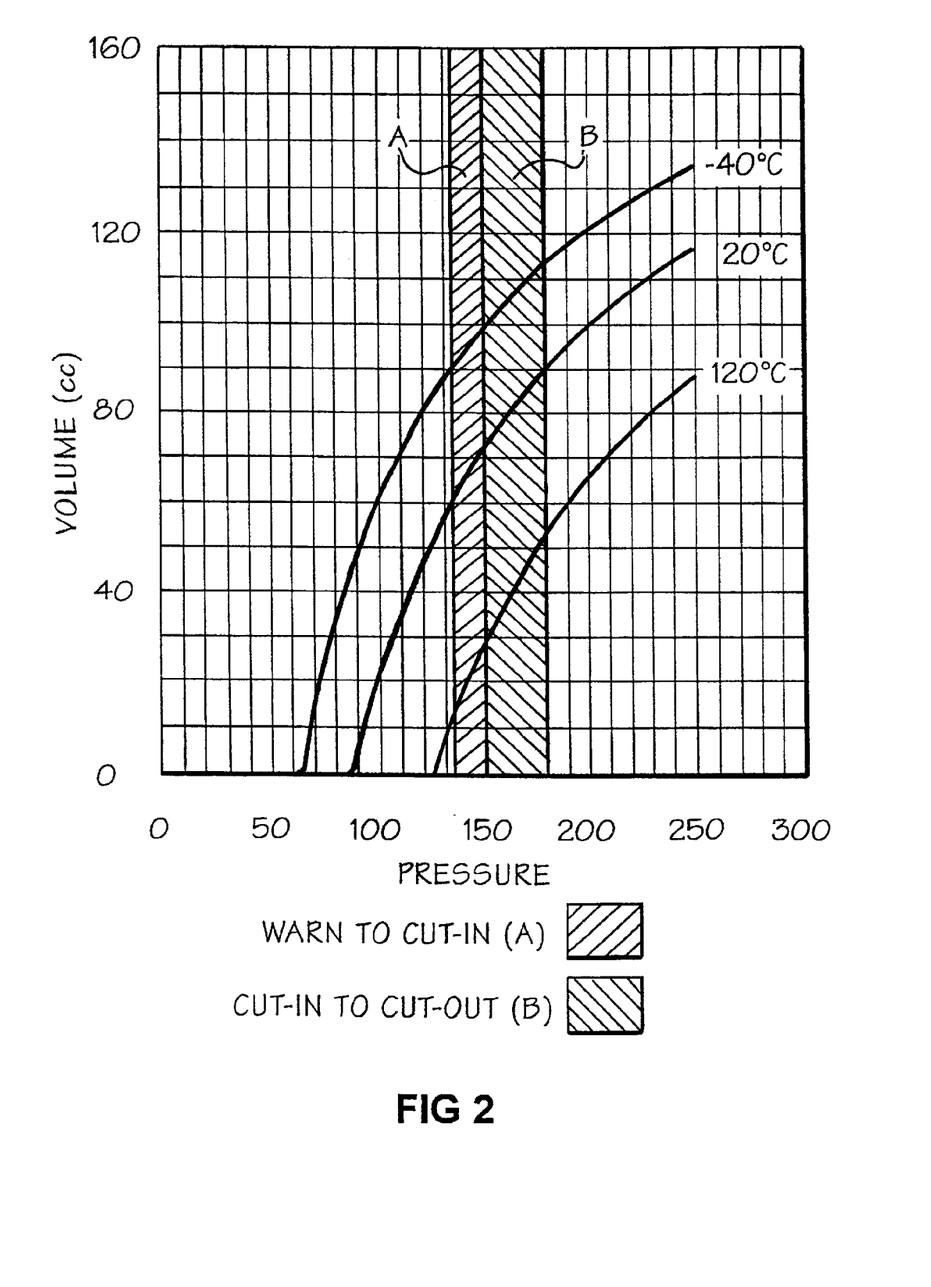
FIG. 2 illustrates typical curves for the available gas volume in a gas-charged diaphragm accumulator at three different temperatures (−40° C., 20° C., 120° C.)

Reference is now directed to the curves of FIG. 2 which show typically how the available volume within a pre-charged diaphragm accumulator varies with applied gas pressure at different temperatures, namely at −40° C., 20° C. and 120° C. The "warning to cut-in" range is shown by the cross-hatching A and the "cut-in to cut-out" range is shown by cross hatching B.

The problem is that the gas-precharge pressure in the accumulator varies with temperature and therefor so does the controlled volume of fluid stored under pressure in the accumulator for use by the EHB system. The present invention seeks to improve and preferably maximise the controlled working volume in at least one of the operating ranges.

Figure 3:
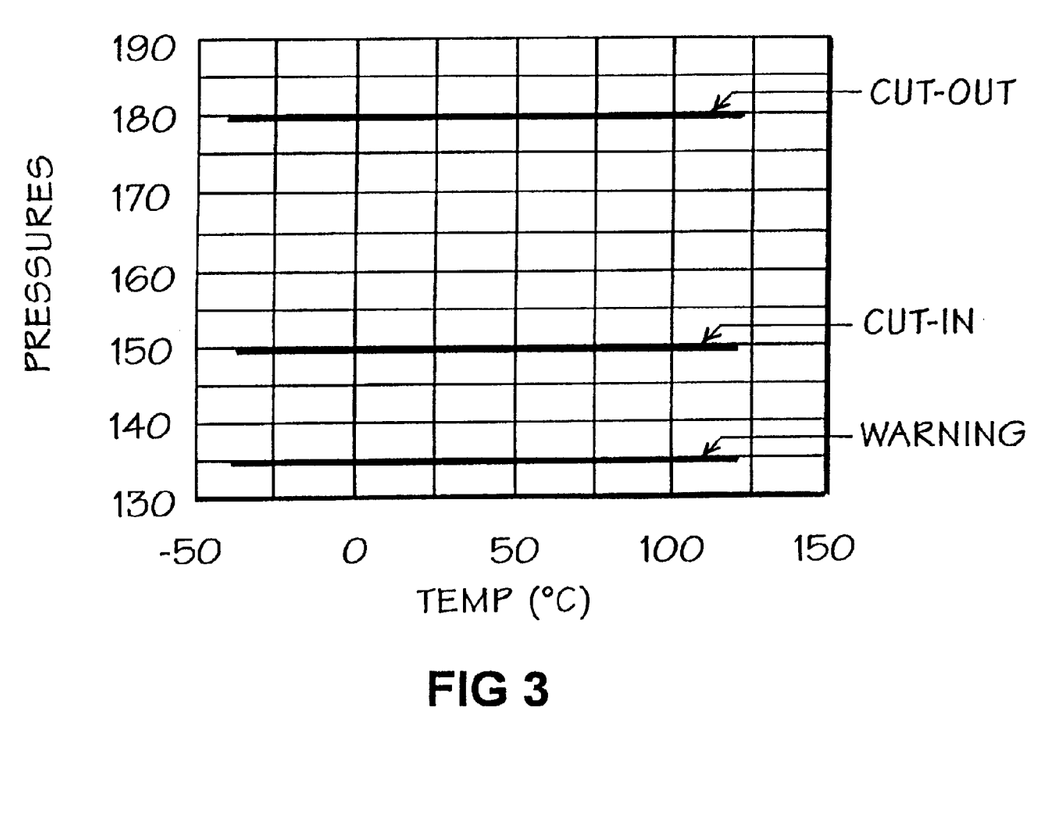
FIG. 3 illustrates the conventional arrangement in which the cut-out, cut-in and warning pressure levels do not vary with temperature.

The conventional practice has been to set cut-out, cut-in and warning pressure levels which do not vary with temperature. This is illustrated by FIGS. 2 and 3. FIG. 3 shows horizontal straight-line traces for the warning, cut-in and cut-out pressure levels with temperature. This solution is dominated by the 120° C. condition where the pre-charge pressure behind the accumulator diaphragm is at its maximum. The minimum warning pressure is controlled by the energy reserve (volume and pressure) required at 120° C. Additionally, cut-in pressure is controlled by the required energy reserve between the cut-in and warning pressure levels (bearing in mind that during a fast brake application with the accumulator at cut-in pressure, there must be sufficient volume available to prevent the pressure falling below the warning level) but now at −40° C. The limitation on cut-out pressure is one of the system and accumulator design. It will be noted that there is an unused volume below warning at lower temperatures which is not available for the system to use.

In accordance with the present invention, at least one of the control pressure levels is varied with temperature. The system therefore embodies a means for measuring the ambient temperature. This can be achieved, for example, directly by a sensor arrangement or indirectly by way of a temperature model. As usual, the sensor means 122 shown in FIG. 1 for measuring the accumulator pressure includes a temperature sensor (not shown) for the purpose of compensating temperature drifts. By this arrangement, the temperature information can be processed within the microcomputer of the system ECU without great expense.

Figure 4:
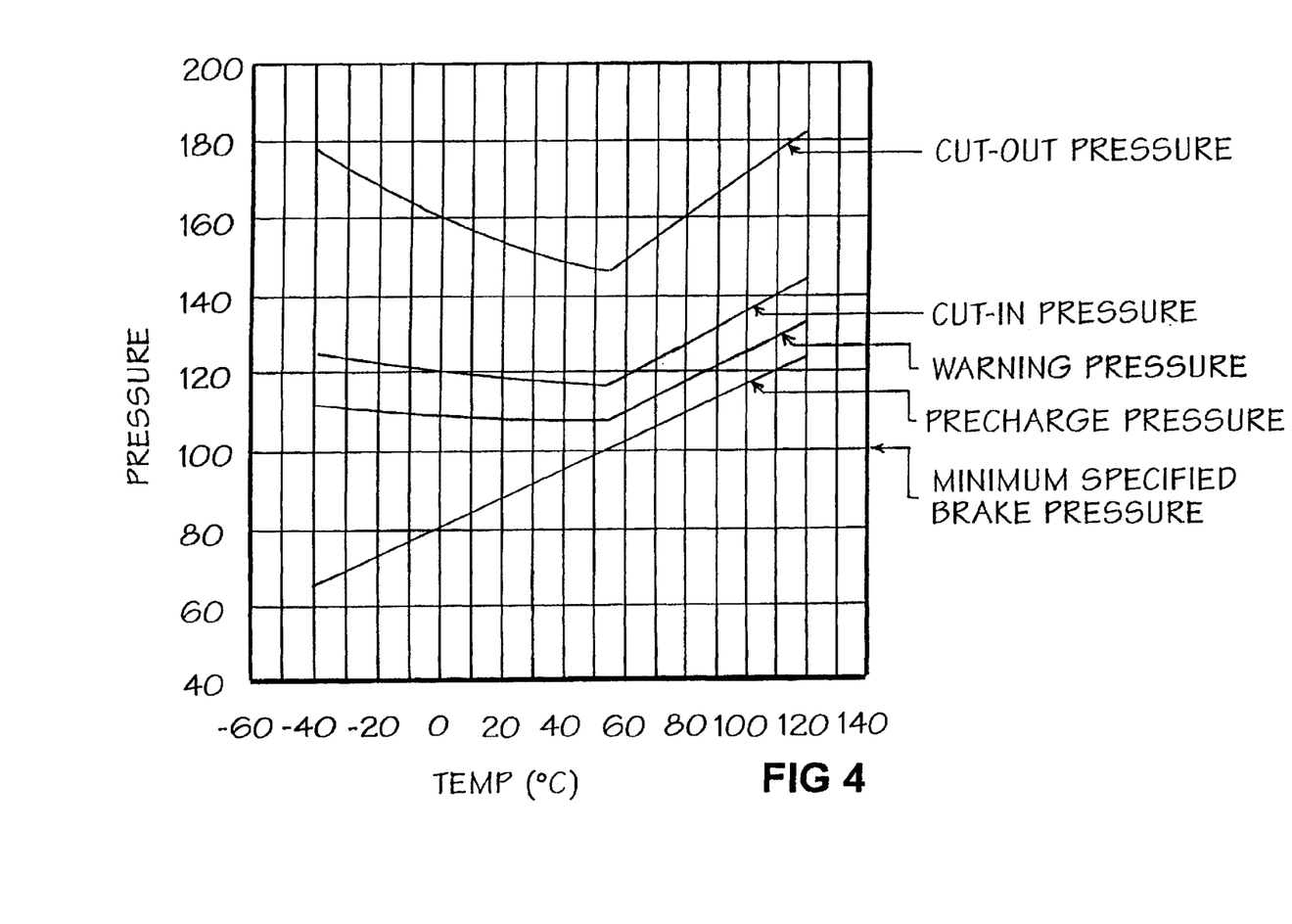
FIG. 4 illustrates how the cut-out pressure, cut-in pressure, and warning pressure levels can be arranged to vary with temperature in accordance with one embodiment of the present invention.

FIG. 4 illustrates an embodiment wherein the control pressure levels are arranged to be modified with temperature to achieve controlled available volume and minimum brake pressure. The control curves where the control pressure varies with temperature can be achieved by suitable programming within the microcomputer of the system ECU. Since, as stated herein before, the pressure as well as temperature information is available within the microcomputer of the system ECU from usually provided components, the variations of the control pressures can be executed either in a closed-loop control mode or by implementing the desired control pressure curves as look-up tables within the memory of the microcomputer of the system ECU. At low temperature and therefore low pre-charge pressure, the stored energy will be at too low a pressure for system use. The Requirements Specified are:

Warning Pressure

Minimum of one brake application below warning pressure.

Cut-in Pressure

Sufficient to prevent accumulator pressure falling to warning pressure during a fast brake application.

Cut-out Pressure

Set by system and accumulator design.

The accumulator pre-charge was chosen for the above graph to give a similar maximum pressure for cut-out at −40° C. and 120° C. The shape of the graph is controlled by the selected pre-charge pressure, volumes and pressure functional requirements. (as defined above). The temperature at which minimum control pressures occur is controlled by the accumulator pre-charge pressure and is the temperature at which accumulator pre-charge is the minimum specified brake pressure requirement. If the pre-charge pressure is increased, this temperature will increase and vice versa Control pressures increase with increasing temperature above this point to maintain the required volumes because of the increasing pre-charge pressure.

At temperatures below this minimum point, the control pressure again needs to increase because of the shape of the charging curves to maintain the requirement of the minimum specified brake pressure requirement at the brakes. The constraint here is the required volume at pressure. There will be additional volume below the minimum specified brake pressure required and available for braking and the system logic may make decisions on its use.

Whilst the model illustrated in FIG. 4 shows the benefits of modifying control pressures with temperature, it does not filly optimise fluid energy storage over temperature.

Figure 5:
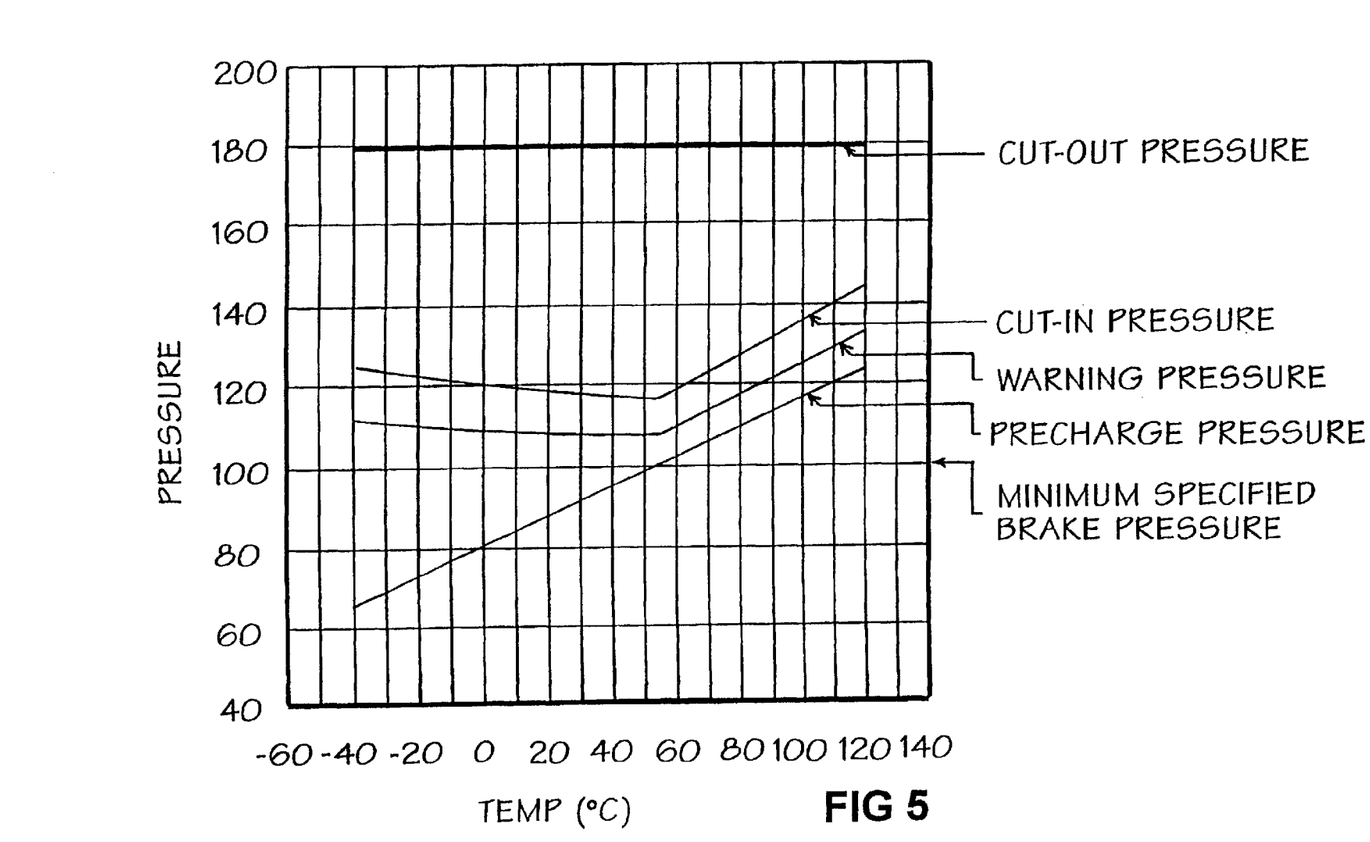
FIG. 5 illustrates how the cut-in pressure and warning pressure levels can be arranged to vary with temperature in accordance with a second embodiment of the present invention.

To optimise control volume (volume between cut-in and cut-out) only the warning and cut-in pressures are modified with temperature using the same volume and pressure requirements as before and cut-out pressure is held constant at the maximum achievable, see FIG. 5.

Figure 6:
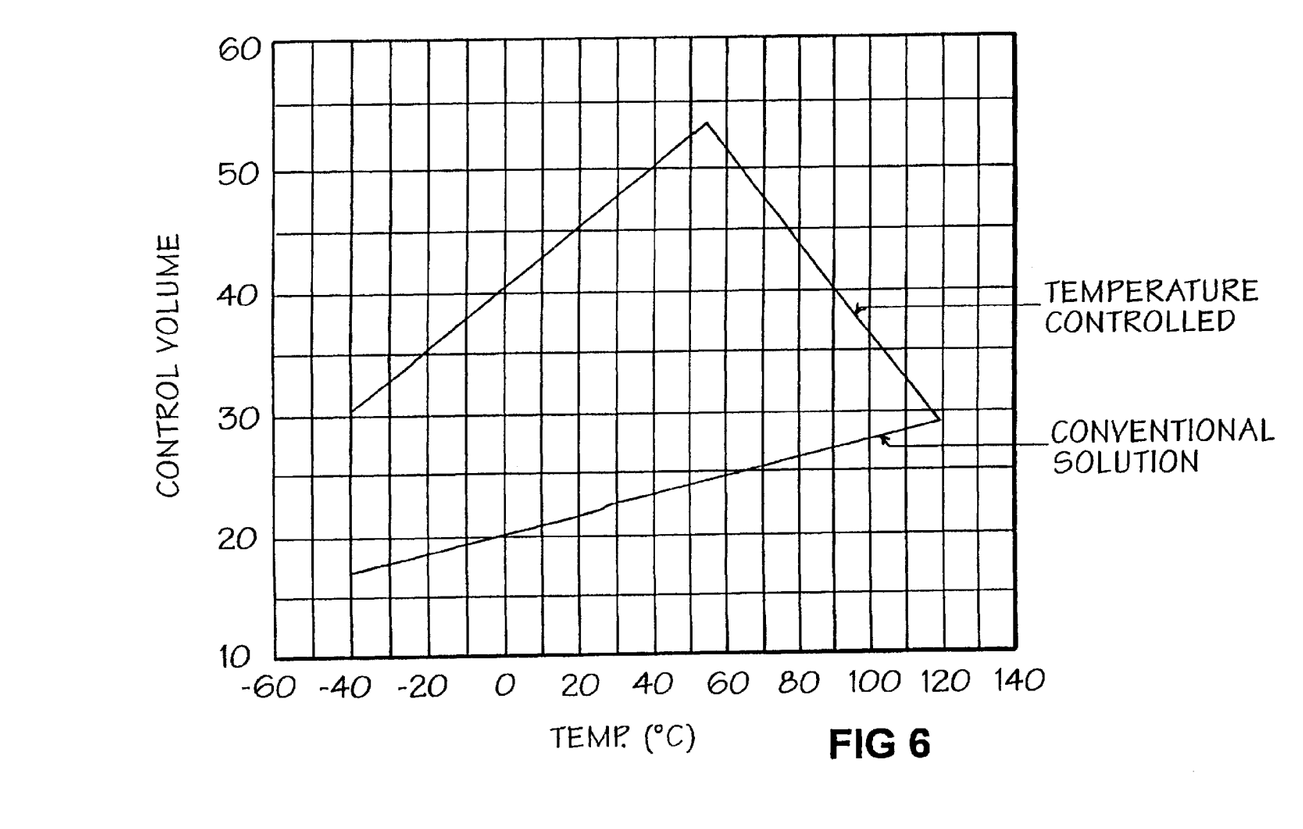
FIG. 6 illustrates how the control volume between cut-in and cut-out can be maximised using a system operating in accordance with FIG. 4.

Controlling the system in the aforegoing manner allows the control volume to be maximised, as illustrated in FIG. 6.

Figure 7:
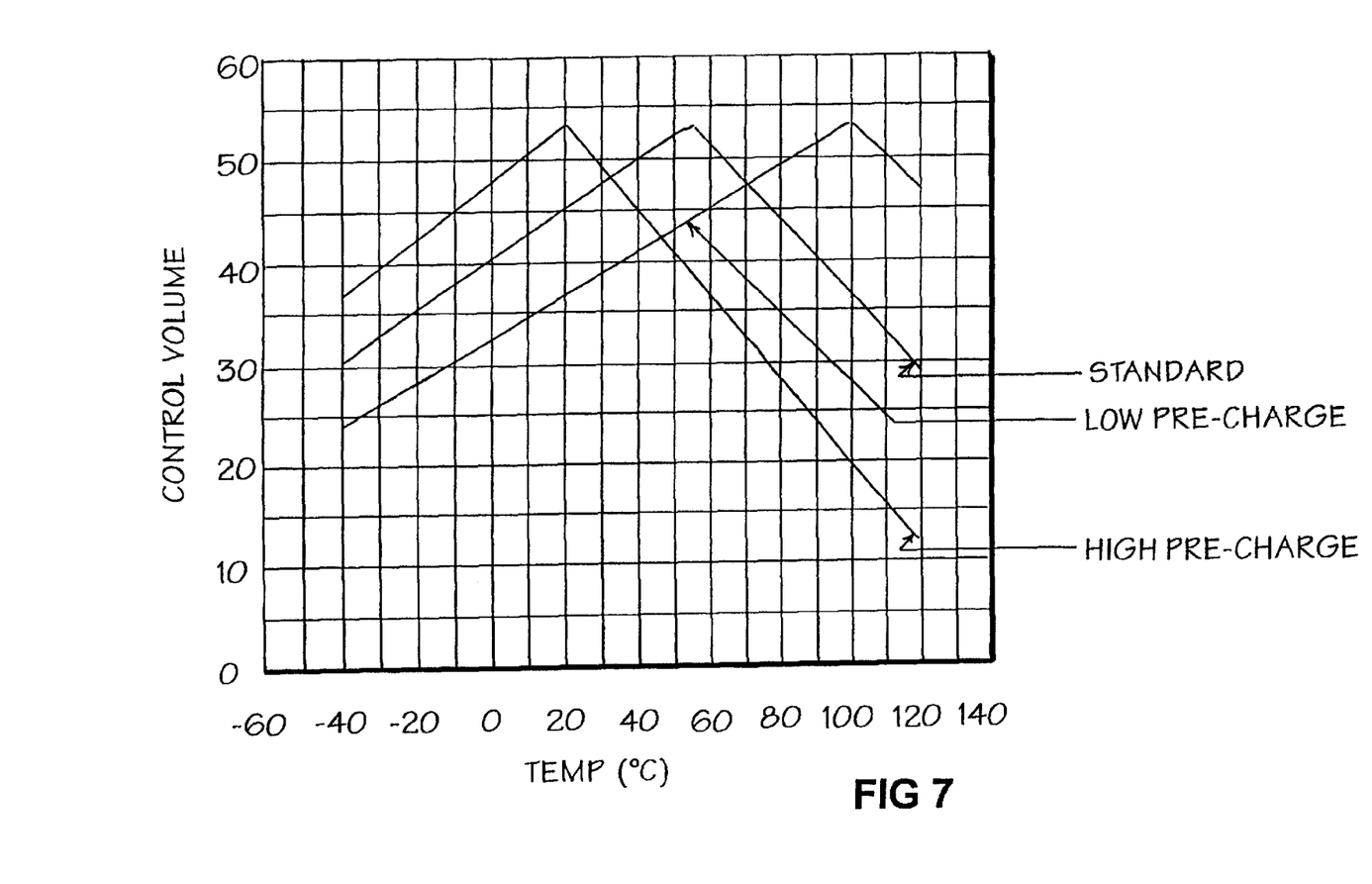
FIG. 7 illustrates how the control volume can be maximised for a preferred operating temperature.

The selected pre-charge pressure controls the temperature at which the maximum volume occurs as illustrated in FIG. 7. Reducing pre-charge increases the temperature at which the maximum volume occurs and conversely increasing pre-charge pressure reduces the temperature for maximum volume. Therefore by selection of pre-charge pressure control volume can be maximised for a preferred operating temperature.

In a still further embodiment, only the warning pressure level is arranged to be varied with temperature. This reduces the control volume to a standard setting level since cut-in and cut-out pressure levels will have to be set to the, say, 120° C. requirements. It also has the result of increased volume between cut-in and warning pressures at temperatures below 120° C. which increases the number of potential brake applications should the pump fail to operate before accumulator pressure has fallen to the warning level.

It would also be possible to modify only the cut-out pressure. This may be used to control the volume between cut-in and cut-out to a minimum requirement.

Furthermore, it is well known that gas charged diaphragm accumulators loose gas during their operating life with the resulting reduction in pre-charge pressure. When allowance is made for gas loss the abovedescribed control still holds with the following results:

1. Pre-charge, warning and cut-in pressures need to increase;
2. The minimum volume reserves below warning and between warning and cut-in increase except at the extremes of operation and life.
3. Control volume is reduced to compensate for item 2 above but will still be higher than conventional control with constant pressure settings.

Thus, the present arrangement enables also a decrease of the pre-charge pressure over the system lifetime to be compensated.

What is claimed is:

1. A vehicle electrohydraulic braking system having a fluid pressure accumulator of the pre-charged diaphragm type which is used to store fluid under pressure, charged by means of a fluid pump or compressor driven either by an electric motor or directly from the vehicle engine for supply to a valve system which is adapted to supply the brake or brakes of the vehicle with fluid pressure in accordance with the level of the driver's braking demand, the control of the accumulator pressure being arranged to lie within a fixed control range, with a cut-in pressure defining the lower limiting pressure of the control range and a cut-out pressure defining the upper limiting pressure of the control range and there being a warning pressure range defined between a warning pressure level and the cut-in pressure, wherein the warning pressure level and at least one of the cut-in and cut-out pressure levels are arranged to be controlled in dependence upon temperature.

2. A vehicle electrohydraulic braking system as claimed in claim 1, wherein all three of the warning, cut-in and cut-out pressure levels are arranged to be varied with temperature.

3. A vehicle electrohydraulic braking system as claimed in claim 1, wherein the warning and cut-in pressure levels are arranged to be varied with temperature but the cut-out pressure level is not.

4. The braking system according to claim 2 wherein the warning pressure level, the cut-in pressure level and the cut-out pressure level decrease with the temperature up to a predetermined temperature and then the warning pressure level, the cut-in pressure level and the cut-out pressure level increase with the temperature beyond the predetermined temperature.

5. The braking system according to claim 3 wherein the warning pressure level and the cut-in pressure level decrease with the temperature up to a predetermined temperature and then the warning pressure level and the cut-in pressure level increase with the temperature beyond the predetermined temperature.

6. A vehicle hydraulic brake system comprising:

a diaphragm type fluid pressure accumulator for storing fluid under pressure;

a source of pressurized fluid comprising one of a fluid pump and a compressor driven by one of an electric motor and a vehicle engine for charging the fluid pressure accumulator;

a valve system for receiving pressurized fluid from at least one of the accumulator and the source for supplying at least one vehicle wheel brake with pressurized fluid at a pressure in accordance with a level of a driver demand, the accumulator pressure being controlled within a control range, the control range having a cut-in pressure defining a lower limiting pressure of the control range and a cut-out pressure defining an upper limiting pressure of the control range, there being a warning pressure range defined between a warning pressure level and the cut-in pressure, wherein the warning pressure level, the cut-in pressure and the cut-out pressure decrease with the temperature up to a predetermined temperature and then the warning pressure level, the cut-in pressure and the cut-out pressure increase with the temperature beyond the predetermined temperature.

7. A vehicle electrohydraulic braking system comprising:

a pre-charged diaphragm type fluid pressure accumulator adapted to store fluid under pressure;

a source of pressurized fluid comprising one of a fluid pump and a compressor driven by one of an electric motor and a vehicle engine for charging the pressure accumulator;

a valve system adapted to receive pressurized fluid from the accumulator and supply the brake or brakes of the vehicle with pressurized fluid in accordance with the level of the driver's braking demand;

a control range for the fluid pressure of the accumulator having a cut-in pressure defining the lower limiting pressure of the control range and a cut-out pressure defining the upper limiting pressure of the control range;

a warning pressure range defined between a warning pressure level and the cut-in pressure; and the warning pressure level and at least one of the cut-in pressure and cut-out pressure arranged to be controlled in dependence upon temperature.

8. A hydraulic system comprising:

a fluid pressure accumulator which is used to store fluid under pressure; and a fluid pump to charge the fluid pressure accumulator, the fluid pump being driven by a power source and adapted to supply a hydraulic component with fluid pressure in accordance with the level of a demand, the accumulator pressure being controlled within a control range, the control range having a cut-in pressure defining a lower limiting pressure of the control range and a cut-out pressure defining an upper limiting pressure of the control range, there being a warning pressure range defined between a warning pressure level and the cut-in pressure, wherein the warning pressure level and at least one of the cut-in pressure and the cut-out pressure are arranged to be controlled in dependence upon temperature.

9. The hydraulic system of claim 8 wherein the fluid pressure accumulator is a pre-charged diaphragm pressure accumulator.

10. The hydraulic system of claim 8 wherein the fluid pump is driven by an electric motor.

11. The hydraulic system of claim 8 wherein the fluid pump is driven by a vehicle engine.

12. The hydraulic system of claim 8 wherein the hydraulic component is a brake.

13. The hydraulic system of claim 8 wherein the demand is a driver's braking demand.

14. The hydraulic system of claim 8 wherein the control range is a fixed control range.

15. The hydraulic system of claim 8 wherein the warning and cut-in pressure levels are controlled to vary with temperature but the cut-out pressure is not.

16. A hydraulic system comprising:

a fluid pressure accumulator which is used to store fluid under pressure; and a fluid pump to charge the fluid pressure accumulator, the fluid pump being driven by a power source and adapted to supply a hydraulic component with fluid pressure in accordance with the level of a demand, the accumulator pressure being controlled within a control range, the control range having a cut-in pressure defining a lower limiting pressure of the control range and a cut-out pressure defining an upper limiting pressure of the control range, there being a warning pressure range defined between a warning pressure level and the cut-in pressure, wherein at least one of the warning pressure level, the cut-in pressure and the out-out pressure is arranged to be controlled in dependence upon temperature, and wherein at least one of the warning pressure level, the cut-in pressure and the cut-out pressure decrease with temperature up to a predetermined temperature and then increases with temperature above the predetermined temperature.

17. The hydraulic system of claim 16 wherein the warning and cut-in pressure levels vary with temperature but the cut-out pressure does not.

18. A vehicle electrohydraulic braking system having a fluid pressure accumulator of the pre-charged diaphragm type which is used to store fluid under pressure, charged by means of a fluid pump or compressor driven either by an electric motor or directly from the vehicle engine for supply to a valve system which is adapted to supply the brake or brakes of the vehicle with fluid pressure in accordance with the level of the driver's braking demand, the control of the accumulator pressure being arranged to lie within a fixed control range, with a cut-in pressure defining the lower limiting pressure of the control range and a cut-out pressure defining the upper limiting pressure of the control range and there being a warning pressure range defined between a warning pressure level and the cut-in pressure, wherein at least one of the warning, cut-in and cut-out pressure levels is arranged to be controlled in dependence upon temperature, and wherein the at least one of the warning, cut-in, and cut out pressure levels fall with rising temperature up to a predetermined temperature and then rise with temperature beyond the predetermined temperature.

19. A hydraulic system comprising:

a fluid pressure accumulator which is used to store fluid under pressure; and a fluid pump to charge the fluid pressure accumulator, the fluid pump being driven by a power source and adapted to supply a hydraulic component with fluid pressure in accordance with the level of a demand, the accumulator pressure being controlled within a control range, the control range having a cut-in pressure defining a lower limiting pressure of the control range and a cut-out pressure defining an upper limiting pressure of the control range, there being a warning pressure range defined between a warning pressure level and the cut-in pressure, wherein at least one of the warning pressure level, the cut-in pressure and the cut-out pressure is arranged to be controlled in dependence upon temperature, and wherein at least one of the warning pressure level, the cut-in pressure and the cut-out pressure decrease with temperature up to a predetermined temperature.

20. A hydraulic system comprising:

a fluid pressure accumulator which is used to store fluid under pressure; and a fluid pump to charge the fluid pressure accumulator, the fluid pump being driven by a power source and adapted to supply a hydraulic component with fluid pressure in accordance with the level of a demand, the accumulator pressure being controlled within a control range, the control range having a cut-in pressure defining a lower limiting pressure of the control range and a cut-out pressure defining an upper limiting pressure of the control range, there being a warning pressure range defined between a warning pressure level and the cut-in pressure, wherein at least one of the warning pressure level, the cut-in pressure and the out-out pressure is arranged to be controlled in dependence upon temperature, and wherein at least one of the warning pressure level, the cut-in pressure and the cut-out pressure increases with temperature above a predetermined temperature.

21. A vehicle electrohydraulic braking system having a fluid pressure accumulator of the pre-charged diaphragm type which is used to store fluid under pressure, charged by means of a fluid pump or compressor driven either by an electric motor or directly from the vehicle engine for supply to a valve system which is adapted to supply the brake or brakes of the vehicle with fluid pressure in accordance with the level of the driver's braking demand, the control of the accumulator pressure being arranged to lie within a fixed control range, with a cut-in pressure defining the lower limiting pressure of the control range and a cut-out pressure defining the upper limiting pressure of the control range and there being a warning pressure range defined between a warning pressure level and the cut-in pressure, wherein the warning pressure level is arranged to be controlled in dependence upon temperature, and the cut-in and cut-out pressure levels are arranged to be controlled independent of temperature.

* * * * *